United States Patent [19]

Nordmann et al.

[11] 3,708,544
[45] Jan. 2, 1973

[54] CHOLERETIC AND ANTI-CONVULSANT MEDICAMENT AND A PROCESS FOR ITS PREPARATION

[75] Inventors: Joseph Nordmann, Paris; Georges Dominique Mattioda, Platanes; Gerard Paul Marie Henri Loiseau, Sceaux, all of France

[73] Assignee: Ugine Kuhlmann, Paris, France

[22] Filed: Jan. 6, 1971

[21] Appl. No.: 104,509

[52] U.S. Cl. ................................260/618 R, 424/343
[51] Int. Cl. .............................................C07c 31/14
[58] Field of Search....................424/343; 260/618 R

[56] References Cited

UNITED STATES PATENTS 3,061,634    10/1962    Palazzo.........................260/618 R X

OTHER PUBLICATIONS

McBee et al., Jour. Org. Chem., Vol. 38, (1963), pages 3579–3580

Primary Examiner—Bernard Helfin
Attorney—Beveridge & Degrandi

[57] ABSTRACT

3'-trifluoromethyl-1-phenyl-2-methyl-1-propanol, compositions containing it, its use in the treatment of hepatic disorders and processes for its preparation.

1 Claim, No Drawings

CHOLERETIC AND ANTI-CONVULSANT MEDICAMENT AND A PROCESS FOR ITS PREPARATION

The present invention relates to a new product which acts as a choleretic and anti-convulsant medicament and to a process for its preparation.

It has been found that the product of the invention is more active than sodium dehydrocholate which is a well-known choleretic.

According to this invention therefore 3'-trifluoromethyl-1-phenyl-2-methyl-1-propanol is provided of the formula:

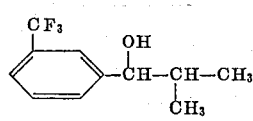

The invention includes a process for the preparation of this compound by condensing the magnesium compound of a 3-halo-trifluoromethyl-benzene with isbutyraldehyde and hydrolyzing the product obtained.

A similar process for the preparation of 3'-trifluoromethyl-1-phenyl-2-methyl-1-propanol comprises condensing the magnesium compound of 2-bromo-propane with 3-trifluoromethylbenzaldehyde and hydrolyzing the product obtained.

The product obtained by this process is a colorless liquid with a boiling point of 112°C. at 15 Torr, which can be identified by its fluorine content, its hydroxyl value and the infra-red absorption bands of the following frequencies: 3485, 1383, 1367, 1327, 1163, 1125, 799 and 702 cm$^{-1}$.

The following Example illustrates in detail the preparation of the compound of this invention and the parts given are parts by weight unless the contrary is indicated:

EXAMPLE 100 parts of 3-bromo-trifluoromethylbenzene are dissolved in 300 parts by volume of dry diethyl ether and 11 parts of magnesium turnings are added. The reaction is started by means of 2 parts of ethyl iodide. The reaction mixture is maintained at reflux temperature for 2 hours. Then 37 parts of isobutyraldehyde are gradually run in over a period of 45 minutes so as to maintain the refluxing, and after the end of the introduction, the mixture is heated for 3½ hours. The ethereal solution is then hydrolyzed by introducing it into a mixture of 850 parts of ice and 165 parts by volume of concentrated hydrochloric acid. After separation of the ether phase, this is washed with water and then with a solution of sodium bicarbonate and is finally dried and the ether is evaporated. The residue is distilled and the fraction of boiling point between 108°C. and 112°C. under 15 Torr is rectified in a Vigreux column provided with a regulatable refluxing head. The fraction of boiling point 112°C. at 15 Torr consists of practically pure 3'-trifluoromethyl-1-phenyl-2-methyl-1-propanol. It is a colorless liquid, insoluble in water but miscible with olive oil and its elementary analysis corresponds to the empirical formula $C_{11}H_{13}FO$.

TOXICOLOGICAL AND PHARMACOLOGICAL PROPERTIES

The compound according to the invention is found to have very little toxicity. When administered orally to rats, at a dose of 900 mg per kg of the weight of the animal, no mortality has been observed.

Its principal pharmacological activity is its action on choleresis, which can be shown by a test of choleretic activity on rats. This consists in determining, on a previously anaesthesized rat, the percentage increase of the basic choleresis after administration of the products to be studied. Female rats of Sprague Dawley strain are used which have fasted for sixteen hours beforehand and these rats are divided into groups of five animals. After anaesthetizing with urethane at a dose of 1 g/kg i.p. and exploratory laparotomy, the choledoch is catheterized by a fine polyethylene cannula the free end of which dips into a 10 ml. test tube graduated to a one-tenth of a milliliter.

The choleresis is recorded every 30 minutes during a control observation period A of 2 hours, then the product is administered at three different doses, each dose being administered to five rats. The quantity of bile excreted is measured every 30 minutes during the first 2 hours (period B) and then the following 2 hours (period C). The percentage of increase or decrease of the average chloreses B and C with respect to the average choleresis control A is established per group of five animals treated.

The activity of the product on the choleresis of the rat is expressed by the percentage variation of the average quantity of bile excreted, firstly during the 2 hours following its administration (period B), and secondly during the 2 hours following (period C) with respect to the average quantity excreted during the 2 control hours (period A). These variations in the biliary flow with respect to the period A are expressed by the following formulae:

Period B:  variation of the biliary flow in %: $(B - A/A) \times 100$

Period C:  variation of the biliary flow in %: $(C - A/A) \times 100$

When administered orally to the rat, the compound according to the invention increases the choleresis, in the described test, in the following proportions:

| doses mg/kg | Period B | Period C |
| --- | --- | --- |
| 100 | 25% | 0% |
| 200 | 51% | 11% |
| 400 | 56% | 19% |

This choleretic action is much superior to that observed, for example, with sodium dehydrocholate taken as a reference product. In the same test, this product only increased the biliary flow, for example, at a dose of 400 mg/kg, by 21 percent for the period B and by 0 percent for the period C.

Further, the product according to the invention possesses an anti-convulsant action which may be shown in well-known ways, for example, by the supramaximal electric shock test (Swinyard et al., J. Pharmacol, 106, 319, 1952) or by that of the convulsions provoked by pentetrazole.

APPLICATION IN HUMAN THERAPY

3'-trifluoromethyl-1-phenyl-2-methyl-1-propanol can be used in human therapy, for example, in the form of gelatinemcoated pills containing doses of 100 mg to 500 mg, as a choleretic and anti-convulsant. The usual dose is from 3 to 4 pills per day.

We claim:
1. 3'-trifluoromethyl-1-phenyl-2-methyl-1-propanol.

* * * * *